(12) United States Patent
Long

(10) Patent No.: US 9,925,724 B2
(45) Date of Patent: Mar. 27, 2018

(54) ADDITIVE MANUFACTURING SYSTEM AND METHOD OF ADDITIVE MANUFACTURE UTILIZING LAYER-BY-LAYER THERMO-MECHANICAL ANALYSIS

(71) Applicant: United Technologies Corporation, Hartford, CT (US)

(72) Inventor: Yu Long, Ithaca, NY (US)

(73) Assignee: United Technologies Corporation, Farmington, CT (US)

( * ) Notice: Subject to any disclaimer, the term of this patent is extended or adjusted under 35 U.S.C. 154(b) by 310 days.

(21) Appl. No.: 14/790,941

(22) Filed: Jul. 2, 2015

(65) Prior Publication Data

US 2016/0001509 A1 Jan. 7, 2016

Related U.S. Application Data

(60) Provisional application No. 62/020,816, filed on Jul. 3, 2014.

(51) Int. Cl.
| | |
|---|---|
| *G05B 19/00* | (2006.01) |
| *G05B 19/4099* | (2006.01) |
| *B22F 3/00* | (2006.01) |
| *B33Y 50/02* | (2015.01) |
| *G06F 17/50* | (2006.01) |

(Continued)

(52) U.S. Cl.
CPC ........ *B29C 67/0088* (2013.01); *B22F 3/1055* (2013.01); *B23K 15/0086* (2013.01); *B29C 67/0077* (2013.01); *B29C 67/0092* (2013.01); *G05B 19/4099* (2013.01); *B22F 2003/1057* (2013.01); *B33Y 10/00* (2014.12);

(Continued)

(58) Field of Classification Search
CPC .................................................. G06F 17/5018
See application file for complete search history.

(56) References Cited

U.S. PATENT DOCUMENTS

| | | | | |
|---|---|---|---|---|
| 5,345,490 A | * | 9/1994 | Finnigan | ................. G06T 17/20 345/420 |
| 6,580,959 B1 | | 6/2003 | Mazumder | |

(Continued)

OTHER PUBLICATIONS

Stava O et al, Stress Relief: ImprovingStructural Strength of 3D Printable Objects, ACM Transactions on Graphics, vol. 31(4), 2012, 11 pages.*

(Continued)

*Primary Examiner* — Mark Connolly
(74) *Attorney, Agent, or Firm* — O'Shea Getz P.C.

(57) ABSTRACT

A method of operating an additive manufacturing system utilizing a layer-by-layer thermo-mechanical analysis system includes the steps of pre-modeling a structure or workpiece into a plurality of slices stacked from a bottom slice to a top slice of the plurality of slices, assuming a second slice modeled immediately below a first slice is a rigid substrate, and run a response force analysis for the first slice. The analysis system may reiterate this process for each slice calculating a force distribution map for each slice, and adding the force distribution maps to a total response force map of the entire structure. The additive manufacturing system may then use the total response force map to optimize material properties for selected regions of each slice to a sacrificial support structure and/or the final product.

20 Claims, 3 Drawing Sheets

(51) Int. Cl.
*B29C 67/00* (2017.01)
*B22F 3/105* (2006.01)
*B23K 15/00* (2006.01)
*B33Y 10/00* (2015.01)
*B33Y 30/00* (2015.01)

(52) U.S. Cl.
CPC .............. *B33Y 30/00* (2014.12); *B33Y 50/02* (2014.12); *G05B 2219/35134* (2013.01); *Y02P 80/40* (2015.11)

(56) References Cited

U.S. PATENT DOCUMENTS

| | | | |
|---|---|---|---|
| 6,721,684 B1* | 4/2004 | Saebi | E04B 1/167 |
| | | | 702/183 |
| 7,047,098 B2* | 5/2006 | Lindemann | B22F 3/1055 |
| | | | 700/118 |
| 7,089,124 B2* | 8/2006 | Dong | B23K 31/02 |
| | | | 702/42 |
| 7,777,155 B2 | 8/2010 | Twelves, Jr. et al. | |
| 8,383,985 B2 | 2/2013 | Twelves, Jr. et al. | |
| 9,079,803 B2 | 7/2015 | Xu | |
| 9,133,712 B2 | 9/2015 | Fisk et al. | |
| 2009/0312960 A1* | 12/2009 | Dang | G06F 17/5018 |
| | | | 702/42 |
| 2014/0170012 A1 | 6/2014 | Delisle et al. | |
| 2014/0199177 A1 | 7/2014 | Propheter-Hinckley et al. | |
| 2014/0314581 A1 | 10/2014 | McBrien et al. | |
| 2015/0003997 A1 | 1/2015 | Mironets et al. | |
| 2015/0096713 A1 | 4/2015 | Marcin | |
| 2015/0142158 A1 | 5/2015 | Szwedka | |
| 2015/0154321 A1* | 6/2015 | Schmidt | B29C 67/0092 |
| | | | 700/98 |
| 2015/0190824 A1 | 7/2015 | Nardi et al. | |
| 2015/0203411 A1 | 7/2015 | Xu | |
| 2015/0251242 A1 | 9/2015 | Propheter-Hinckley et al. | |

OTHER PUBLICATIONS

Van Belle et al., "Investigation of residual stresses induced during selective laser melting process", Key Engineering Materials, Trans Tech Publications, vol. 554-557, Jan. 2013, pp. 1828-1834.
EP extended search report dated Nov. 20, 2015.
Van Belle et al., "Comparisons of numerical modelling of the Selective Laser Melting", Key Engineering Materials, Trans Tech Publications, vol. 504-506, 2012, pp. 1067-1072.
EP Office Action for EP Patent Appln. No. 15 175 310.0 dated Nov. 27, 2017.

* cited by examiner

ADDITIVE MANUFACTURING SYSTEM AND METHOD OF ADDITIVE MANUFACTURE UTILIZING LAYER-BY-LAYER THERMO-MECHANICAL ANALYSIS

This application claims priority to U.S. Patent Appln. No. 62/020,816 filed Jul. 3, 2014.

BACKGROUND

The present disclosure relates to an additive manufacturing system and method of additive manufacturing, and more particularly, to an additive manufacturing system and method of additive manufacturing utilizing a form of layer-by-layer thermo-mechanical analysis.

Design optimization of structures is essential in most mechanical industries including aviation. Optimized structures must meet their intended mechanical and/or functional performance while typically being robust and low in cost to manufacture. Further, such parts must typically meet weight restrictions, quality criteria, and maintain a degree of reliability or useful life. Additive manufacturing (AM) is one process known to be a candidate for producing such optimized structures.

Opportunity, however, still exists to optimize the additive manufacturing process itself. For example, not only should a structure meet its mechanical and/or functional performance (i.e. a part performing its design intent), portions of the structure must meet certain mechanical criteria enabling additive manufacture of the next portion of the structure. Optimization of the AM process itself offers further opportunity to optimize the final structure.

SUMMARY

A method of additive manufacturing a structure of one, non-limiting, embodiment includes the steps of pre-modeling the structure into a plurality of stacked slices; and performing a response force analysis between a top slice and an adjacent lower second slice, wherein the analysis models the second slice as a rigid substrate.

Additionally to the foregoing embodiment, the method includes the step of performing a response force analysis between the second slice and an adjacent lower third slice, wherein the analysis no longer models the second slice as a rigid substrate and models the third slice as a rigid substrate.

In the alternative or additionally thereto, in the foregoing embodiment, the method includes the steps of determine if the first slice has an unsupported area; and calculating a first response force distribution map of the unsupported area of the first slice.

In the alternative or additionally thereto, in the foregoing embodiment, the method includes the steps of determine if the second slice has an unsupported area; and calculating a second response force distribution map of the unsupported area of the second slice.

In the alternative or additionally thereto, in the foregoing embodiment, the method includes the step of calculating a total response force map from the first and second response force distribution maps.

In the alternative or additionally thereto, in the foregoing embodiment, the method includes the step of design material properties of the structure based at least in-part by the total response force map.

In the alternative or additionally thereto, in the foregoing embodiment, material properties include density distribution of mass.

In the alternative or additionally thereto, in the foregoing embodiment, material properties include material composition.

In the alternative or additionally thereto, in the foregoing embodiment, the design of material properties is limited by the functional requirements of the structure during design intended operation.

In the alternative or additionally thereto, in the foregoing embodiment, the design of material properties prevents over-constraint of the unsupported areas.

In the alternative or additionally thereto, in the foregoing embodiment, the method includes the step of incorporating a sacrificial support structure as part of the structure to support the unsupported areas.

In the alternative or additionally thereto, in the foregoing embodiment, the design of material properties prevents warpage of slices as a result of additive manufacturing.

In the alternative or additionally thereto, in the foregoing embodiment, the design of material properties prevents delamination between slices.

In the alternative or additionally thereto, in the foregoing embodiment, the additive manufacturing is direct metal laser sintering.

In the alternative or additionally thereto, in the foregoing embodiment, the additive manufacturing is electron beam melting.

An additive manufacturing system according to another, non-limiting, embodiment includes a build table for supporting a structure; an energy gun for successively melting a plurality of slices of the structure over one-another, with the build table and the energy gun constructed and arranged to move away from one-another as each slice of the plurality of slices is manufactured; and an electric controller constructed and arranged to model the structure into the plurality of slices and having a layer-by-layer thermo-mechanical analysis system for determining optimized material properties of at least a portion of the structure.

In the alternative or additionally thereto, in the foregoing embodiment, the layer-by-layer thermo-mechanical analysis system assumes a second slice modeled immediately below a first slice of the plurality of slices is a rigid substrate, runs a response force analysis for the first slice, determines if the first slice has an unsupported area and if so calculates a first response force distribution map of the unsupported area of the first slice, then assumes a third slice of the plurality of slices immediately below the second slice is a rigid substrate, runs a response force analysis for the second slice, determines if the second slice has an unsupported area and if so calculates a second response force distribution map of the unsupported area of the second slice, and calculates a total response force map from the first and second response force distribution maps.

In the alternative or additionally thereto, in the foregoing embodiment, the controller is constructed and arranged to control the energy gun based at least in-part on the optimized material properties for each slice.

In the alternative or additionally thereto, in the foregoing embodiment, the system includes a spreader for placing a layer of powder over the last manufactured slice; and wherein the controller is constructed and arranged to control the spreader for altering powder material composition based at least in-part on the optimized material properties for each slice.

In the alternative or additionally thereto, in the foregoing embodiment, the energy gun is a laser gun.

In the alternative or additionally thereto, in the foregoing embodiment, the energy gun is an electron beam gun.

In the alternative or additionally thereto, in the foregoing embodiment, the layer-by-layer thermo-mechanical analysis system determines the location and optimized material properties of at least one sacrificial support structure of the structure.

The foregoing features and elements may be combined in various combinations without exclusivity, unless expressly indicated otherwise. These features and elements as well as the operation thereof will become more apparent in-light of the following description and the accompanying drawings. It should be understood, however, the following description and figures are intended to be exemplary in nature and non-limiting.

BRIEF DESCRIPTION OF THE DRAWINGS

Various features will become apparent to those skilled in the art from the following detailed description of the disclosed non-limiting embodiments. The drawings that accompany the detailed description can be briefly described as follows.

DETAILED DESCRIPTION

Additive manufacturing systems include, for example, Additive Layer Manufacturing (ALM) devices, such as Direct Metal Laser Sintering (DMLS), Selective Laser Melting (SLM), Laser Beam Melting (LBM) and Electron Beam Melting (EBM) that provide for the fabrication of complex metal, alloy, polymer, ceramic and composite structures by the freeform construction of a workpiece, layer-by-layer. The principle behind additive manufacturing processes involves the selective melting of atomized precursor powder beds by a directed energy source, producing the lithographic build-up of the workpiece. The melting of the powder occurs in a small localized region of the energy beam, producing small volumes of melting, called melt pools, followed by rapid solidification, allowing for very precise control of the solidification process in the layer-by-layer fabrication of the workpiece. These devices are directed by three-dimensional geometry solid models developed in Computer Aided Design (CAD) software systems.

The EBM system utilizes an electron beam gun and the DMLS, SLM, and LBM systems utilize a laser as the energy source. Both system beam types are focused by a lens, then deflected by an electromagnetic scanner or rotating mirror so that the energy beam selectively impinges on a powder bed. The EBM system uses a beam of electrons accelerated by an electric potential difference and focused using electromagnetic lenses that selectively scans the powder bed. The DMLS, SLM and LBM utilize a focused laser beam scanned by a rotating mirror. The EBM technology offers higher power densities, and therefore faster scanning rates, over lasers, and is capable of processing superalloys. The powder is melted at the energy focus site on the build surface or substrate. The strategy of the scanning, power of the energy beam, residence time or speed, and sequence of melting are directed by an embedded CAD system. The precursor powder may be gravitationally fed from cassettes or loaded by a piston (as two non-limiting examples) so that it can be raked onto the build table. The excess powder is raked off and collected for re-application. Since the electron gun or laser may generally be fixed, the build table may be lowered with each successive layer so that the workpiece is built upon the pre-solidified layer beneath.

Figure 1:
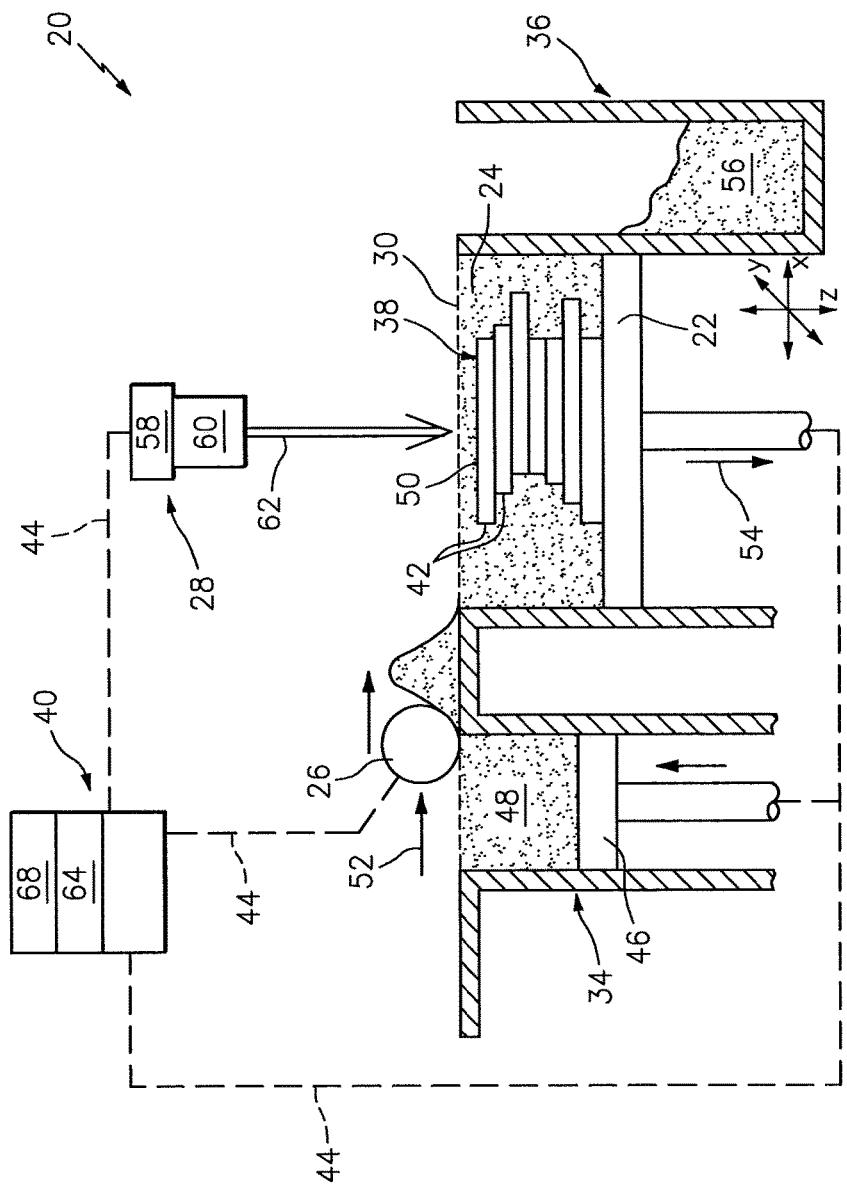
FIG. 1 is a schematic view of an additive manufacturing system according to one non-limiting embodiment of the present disclosure.

FIG. 1 schematically illustrates an additive manufacturing system 20 as one, non-limiting, example of the present disclosure having a build table 22 for holding a powder bed 24, a particle spreader, wiper, or spray device 26 for producing the powder bed 24, an energy gun 28 for selectively melting regions of a layer 30 of the powder bed, a powder supply hopper 34 and a powder surplus hopper 36. The additive manufacturing system 20 is constructed to build a workpiece or structure 38 in a layer-by-layer fashion utilizing an additive manufacturing process controlled by an electrical controller 40 that may have an integral computer aided design system for modeling the structure 38 into a plurality of slices 42 additively built atop one-another generally in a vertical or z-coordinate direction.

The controller 40 controls the various components and operations through electric signals 44 that may be hardwired, or wirelessly coupled, between one or more of the system components 22, 26, 28, 34. The controller 40 may be implemented with a combination of hardware and software. The hardware may include memory and one or more single-core and/or multi-core processors. The memory may be a non-transitory computer readable medium, and adapted to store the software (e.g. program instructions) for execution by the processors. The hardware may also include analog and/or digital circuitry other than that described above.

Figure 2:
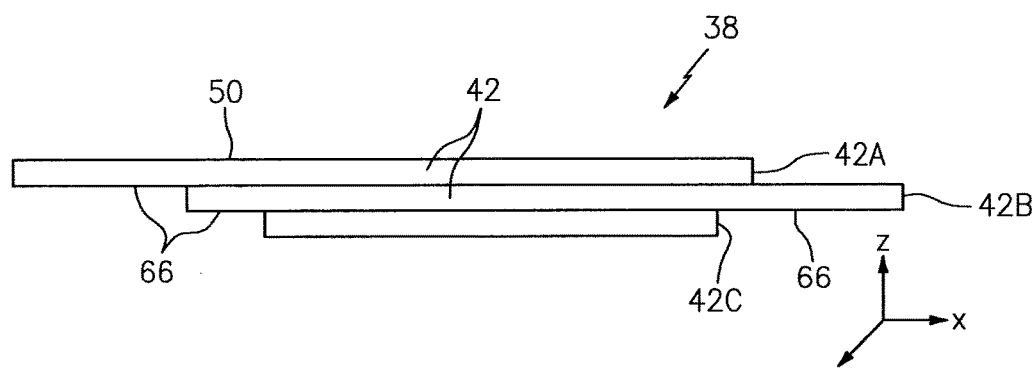
FIG. 2 is a partial cross section of modeled slices of a structure manufactured by the additive manufacturing system.

Referring to FIGS. 1 and 2, each solidified slice 42 of the structure 38 is associated with and produced from a respective layer 30 of the powder bed 24 prior to solidification. The powder layer 30 is placed on top of (or spread over) a build surface 50 of the previously solidified slice 42, or during initial operation, the build table 22. The controller 40 operates the system 20 through the series of electrical and/or digital signals 44 sent to the system 20 components. For instance, the controller 40 may send a signal 44 to a mechanical piston 46 of the supply hopper 34 to push a supply powder 48 upward for receipt by the spreader 26. The spreader 26 may be a wiper, roller, sprayer or other device that pushes (see arrow 52), sprays or otherwise places the supply powder 48 over a top build surface 50 of the structure 38 by a pre-determined thickness established by vertical, downward, movement (see arrow 54) of the build table 22 that supports the powder bed 24 and structure 38. Any excess powder 56 may be pushed into the surplus hopper 36 by the spreader 26. The controller 40 may further control the spreader 26 to alter the material composition of selected regions of each slice 42.

Once a substantially level powder layer 30 is established over the build surface 50, the controller 40 may send a signal to the energy gun 28 that energizes a laser or electron beam device 58 and controls a directional mechanism 60 of the gun 28. The directional mechanism 60 may include a focusing lens that focuses a beam (see arrow 62) emitted from device 58 which, in-turn, may be deflected by an electromagnetic scanner or rotating mirror of the directional mechanism 60 so that the energy beam 62 selectively and controllably impinges upon, and thereby focuses a beam spot on selected regions of the top layer 30 of the powder bed 24. The beam spot moves along the layer 30, melting at least a portion of the layer, region-by-region, and at a controlled rate and power to form the region into a melt pool, or melted state, and heat or partially melt the build surface 50 beneath the melt pool (i.e. meltback region) to promote the desired sintering and fusing of the powder and the joinder between slices. It is contemplated and understood that the powder 48 may not have an actual powder consistency (i.e. physical form), but may take the form of any raw material capable of being fused, sintered or melted upon a build surface of a workpiece or structure and in accordance with additive manufacturing techniques. It is further understood and contemplated that the additive manufacturing system may include a method where fusing of powder is done by high-speed accumulation and then laser sintered (laser spray deposition).

The structure 38 or portion of the structure is illustrated as three slices 42. As previously described, each slice 42 may be modeled via a modeling software system 64 (e.g. a CAD system, see FIG. 1) and may include unsupported areas 66 that generally face downward and in the Z-coordinated direction. The modeling software system 64 may be part of the controller 40 or an independent system with the controller capable of receiving data input from the modeling software system 64. The modeling software system 64 also includes an embedded layer-by-layer thermo-mechanical analysis system or software 68 (e.g. finite element analysis). Alternatively, the layer-by-layer thermo-mechanical analysis system 68 may be an independent system with the modeling software system 64 capable of receiving data input from the layer-by-layer thermo-mechanical analysis system 68.

Figure 3:
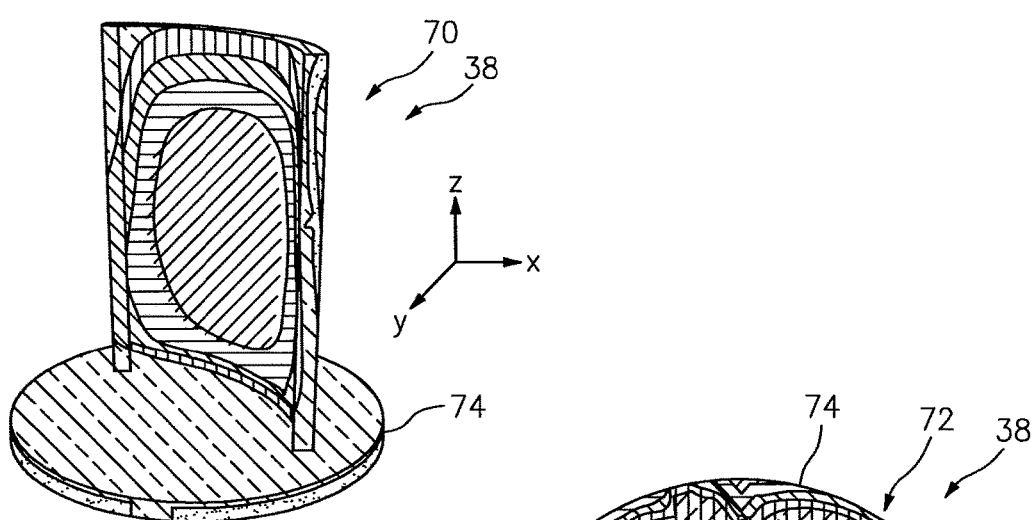
FIG. 3 is a perspective view of a structure illustrating a total response force map.
Figure 4:
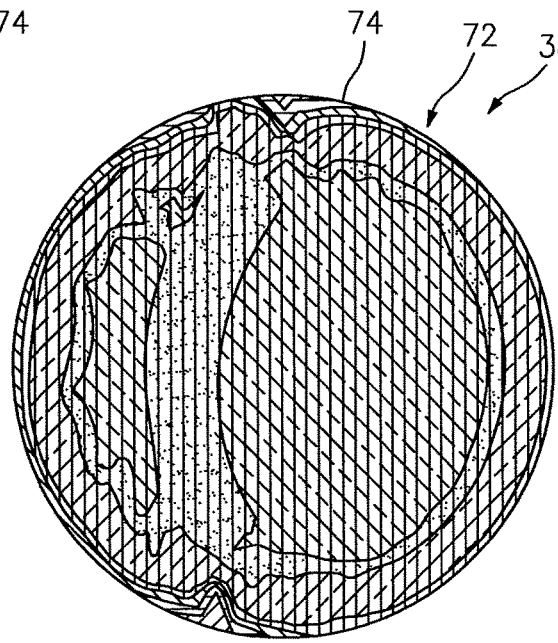
FIG. 4 is a plan view of a portion of the structure illustrating a response force distribution map.

Referring to FIGS. 2 through 4, the layer-by-layer thermo-mechanical analysis system 68 is capable of calculating a total response force map 70 that may be used to determine the design of material properties for each slice 42. The 'response force' represents, for example, the bonding force between slices 42 to prevent delamination. More specifically, the layer-by-layer thermo-mechanical analysis system 68 is a pre-fabrication calculation/optimization first from a top slice 42 and working down to a lower or bottom slice that is representative of the total response force map 70. The analysis system 68 generally enables a thermal mechanical simulation of forces between slices, taking into account stresses and forces attributable to the fast heating and cooling processes created by the additive manufacturing system 20.

FIG. 3 generally depicts the total response force map 70 of an aviation airfoil as one, non-limiting, example of the structure 38. The total response force map 70 may represent interlayer stresses placed upon the entire structure 68 as a result of the additive manufacturing process and not necessarily stresses placed upon the structure 38 as a result of intended operation or function. For example, by calculating the total response force map 70, the controller 40 can determine the appropriate density distribution of mass (such as for example material porosity) of a material of a slice portion having an unsupported area 66 to prevent a variety of manufacturing defects including unsupported area warpage and/or melt penetration into the underlying powder bend that may lead to other defects including delamination, distortion, and undesired features including dipping and rough surfaces, as examples. The total response force map 70 may also assist the controller 40 in directing the additive manufacturing system 20 to change material compositions at selected regions of individual slices 42, or may recognize opportunities to design micro-structures within a slice. As one advantageous example, the layer-by-layer thermo-mechanical analysis system 68 enables recognition of areas of a slice that can be more porous thus reducing the weight of the final structure 38 and/or may recognize areas requiring greater material density to improve bonding between slices providing a more robust and stronger structure.

The total response force map 70 is generally calculated from response force distribution maps 72 of each slice 42 (see FIG. 4 illustrating a bottom slice of a platform 74 of the airfoil 38). The distribution map 72 is generally a two-dimensional map taken along an x-y coordinate plane. Generally, each distribution map 72 is calculated from the top slice (i.e. last slice to be manufactured) and working downward. That is, the modeled slice 42 immediately beneath the modeled slice being evaluated by the analysis system 68 is assumed to be a rigid substrate and the distribution map 72 is thereby calculated and added to the total response force map 70. The analysis system 68 then evaluates the slice 42 previously assumed to be a rigid substrate, by assuming the next lower slice is a rigid substrate. The distribution map 72 calculated is added to the total response force map 70 and this sequence of events repeats itself until the bottom slice is evaluated; thereby, completing the total response force map 70 for the entire structure 38.

It is further contemplated and understood that the present disclosure may apply toward the additive manufacturing of a sacrificial support structures 74S. For example, the platform 74 of the airfoil 38 (see FIG. 4) may not be an actual platform, but may instead be the sacrificial support structure 74S used to additive manufacture the airfoil 38 thereon. Therefore, each slice 38 of the total structure 38 (i.e. final airfoil product, and the sacrificial structure 74S as the bottom slice) from the top down has a sequentially calculated response force distribution map, each added to the previous map, and through the sacrificial structure 74S as the final or bottom slice. The resultant total response force map is representative of the sacrificial support structure 74S and is used to determine the material composition and or density of the sacrificial support structure 74S. After additive manufacturing, the support structure may be removed by more conventional means such as machining. The response force map 70, previously described, may be applied to locate unsupported areas 66 of the workpiece 38 requiring a sacrificial support structure 74S. Additionally, the response force map 70 may be applied to optimize the material composition of the sacrificial support structure 74S thereby preventing workpiece defects previously described (e.g. delamination and/or warpage).

The layer-by-layer thermo-mechanical analysis system 68 begins modeling with a top slice 42 of the plurality of slices and models the next adjacent lower slice (i.e. second slice) as a rigid substrate. As an iterative process, the system 68 then models the next adjacent lower slice (i.e. third slice) from the second slice as a rigid substrate and no longer models the second slice as a rigid substrate. A force distribution map 72 is calculated for each slice (i.e. top and second slice) and a total response force map 70 is calculated from the summation of the force distribution maps 72. Map 70 in this example would be representative of the interface between the second slice and the third slice wherein the third slice is assumed to be a rigid substrate. If the second slice is cantilevered or overhangs the third slice (i.e. unsupported area 66), warpage of the overhanging portion may be one example of a possible defect. To correct for warpage potential, the overhanging portion of the second slice may be modeled with a denser material composition, or a sacrificial support structure 74S may be generally added to the third slice such that the structure 74S interfaces directly with the overhanging area 66. Since this mapping process is iterative, the fourth layer may then be modeled as a rigid substrate and a force distribution map 72 may be calculated for the third slice (with the sacrificial support structure 74S).

Figure 5:
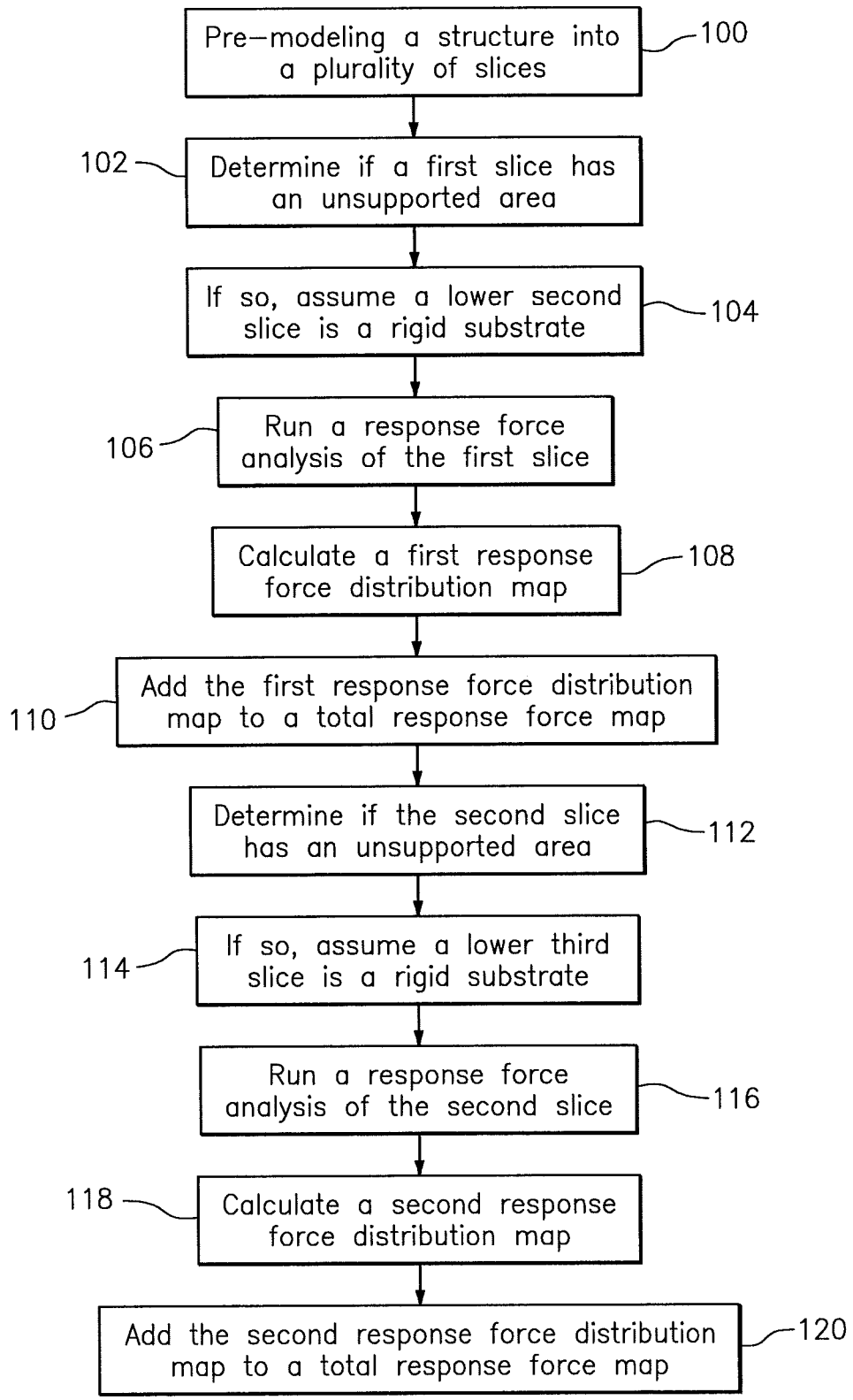
FIG. 5 is a flow chart of a method of operating the additive manufacturing system.

Referring to FIG. 5, a method of additive manufacturing of the present disclosure may include a first step 100 of pre-modeling the structure via the modeling software system 64 into a plurality of slices 42 stacked upon one-another that may be in a vertical, z-coordinate, direction. A next step 102 (also see FIG. 2) may include determining is a first or upper slice 42A has an unsupported area 66. If the first slice 42A has an unsupported area 66, a next step 104 may include assuming a second slice 42B modeled immediately below the first slice 42A is a rigid substrate by the analysis system 68. A next step 106 may include running a response force analysis of the first slice 42A by the analysis system 68. A next step 108 may include calculating a first response force distribution map. A next step 110 may include adding the first response force distribution map to a total response force map 70.

With the first slice 42A analyzed, a next step 112 may include determining if the second slice 42B has an unsupported area 66. If the second slice 42B has an unsupported area 66, a next step 114 may include assuming a third slice 42C modeled immediately below the second slice 42B is a rigid substrate by the analysis system 68. A next step 116 may include running a response force analysis of the second slice 42B by the analysis system 68. A next step 118 may include calculating a second response force distribution map 72. A next step 120 may include adding the second response force distribution map 72 to the total response force map 70. The process may then repeat itself, on-downward, from one slice to the next and until the entire modeled structure 38 is analyzed providing a completed total response force map 70. The completed response force map 70 may then be inputted to the modeling software system 64 and or controller 40 to optimize the material properties of selected regions of each slice 42.

It is understood that relative positional terms such as "forward," "aft," "upper," "lower," "above," "below," and the like are with reference to the normal operational attitude and should not be considered otherwise limiting. It is also understood that like reference numerals identify corresponding or similar elements throughout the several drawings. It should be understood that although a particular component arrangement is disclosed in the illustrated embodiment, other arrangements will also benefit. Although particular step sequences may be shown, described, and claimed, it is understood that steps may be performed in any order, separated or combined unless otherwise indicated and will still benefit from the present disclosure.

The foregoing description is exemplary rather than defined by the limitations described. Various non-limiting embodiments are disclosed; however, one of ordinary skill in the art would recognize that various modifications and variations in light of the above teachings will fall within the scope of the appended claims. It is therefore understood that within the scope of the appended claims, the disclosure may be practiced other than as specifically described. For this reason, the appended claims should be studied to determine true scope and content.

What is claimed is:

1. A method of additive manufacturing a structure, comprising:

pre-modeling the structure into a plurality of stacked slices;

performing a response force analysis between a top slice and an adjacent lower second slice, wherein the analysis models the second slice as a rigid substrate; and performing a response force analysis between the second slice and an adjacent lower third slice, wherein the analysis no longer models the second slice as a rigid substrate and models the third slice as a rigid substrate.

2. The method according to claim 1 comprising the further steps of:

determining if the second slice has an unsupported area; and calculating a second response force distribution map of the unsupported area of the second slice.

3. The method according to claim 2 comprising the further step of:

calculating a total response force map from the first and second response force distribution maps.

4. The method according to claim 3 comprising the further step of:

design material properties of the structure based at least in-part by the total response force map.

5. The method according to claim 4, wherein material properties include density distribution of mass.

6. The method according to claim 4, wherein material properties include material composition.

7. The method according to claim 4, wherein the design of material properties is limited by the functional requirements of the structure during design intended operation.

8. The method according to claim 4, wherein the design of material properties prevents over-constraint of the unsupported areas.

9. The method according to claim 4, wherein the design of material properties prevents warpage of slices as a result of additive manufacturing.

10. The method according to claim 4, wherein the design of material properties prevents delamination between slices.

11. The method according to claim 3, comprising the further step of:

incorporating a sacrificial support structure as part of the structure to support the unsupported areas.

12. The method according to claim 3, wherein the additive manufacturing is direct metal laser sintering.

13. The method according to claim 3, wherein the additive manufacturing is electron beam melting.

14. A method of additive manufacturing a structure, comprising:

pre-modeling the structure into a plurality of stacked slices;

performing a response force analysis between a top slice and an adjacent lower second slice, wherein the analysis models the second slice as a rigid substrate;

determining if the top slice has an unsupported area; and calculating a first response force distribution map of the unsupported area of the top slice.

15. An additive manufacturing system comprising:

a build table for supporting a structure;

an energy gun for successively melting a plurality of slices of the structure over one-another, with the build table and the energy gun constructed and arranged to move away from one-another as each slice of the plurality of slices is manufactured; and an electric controller constructed and arranged to model the structure into the plurality of slices and having a layer-by-layer thermo-mechanical analysis system for determining optimized material properties of at least a portion of the structure;

wherein the layer-by-layer thermo-mechanical analysis system models a second slice immediately below a first slice of the plurality of slices as a rigid substrate, runs a response force analysis for the first slice, determines if the first slice has an unsupported area and if so calculates a first response force distribution map of the unsupported a of the first slice, then models a third slice of the plurality of slices immediately below the second slice as a rigid substrate, runs a response force analysis for the second slice, determines if the second slice has an unsupported area and if so calculates a second response force distribution map of the unsupported area of the second slice, and calculates a total response force map from the first and second response force distribution maps.

16. The additive manufacturing system set forth in claim 15, wherein the controller is constructed and arranged to control the energy gun based at least in-part on the optimized material properties for each slice.

17. The additive manufacturing system set forth in claim 15 further comprising:
a spreader for placing a layer of powder over the last manufactured slice, wherein the controller is constructed and arranged to control the spreader for altering powder material composition based at least in-part on the optimized material properties for each slice.

18. The additive manufacturing system set forth in claim 15 wherein the energy gun is a laser gun.

19. The additive manufacturing system set forth in claim 15 wherein the energy gun is an electron beam gun.

20. The additive manufacturing system set forth in claim 15, wherein the layer-by-layer thermo-mechanical analysis system determines the location and optimized material properties of at least one sacrificial support structure of the structure.

* * * * *